United States Patent [19]
Knight

[11] Patent Number: 5,406,061
[45] Date of Patent: Apr. 11, 1995

[54] BAR CODE SCANNER OPERABLE AT DIFFERENT FREQUENCIES

[75] Inventor: Gerard Knight, Nesconset, N.Y.

[73] Assignee: Opticon Inc., Orangeburg, N.Y.

[21] Appl. No.: 75,381

[22] Filed: Jun. 19, 1993

[51] Int. Cl.⁶ .............................. G06K 7/01
[52] U.S. Cl. ..................... 235/462; 235/472
[58] Field of Search ............ 235/467, 472, 466, 462; 395/500, 550

[56] References Cited

U.S. PATENT DOCUMENTS 4,780,844  10/1988  Keller ................................. 395/550
4,823,262   4/1989  Calle .................................. 395/550
4,931,924   6/1990  kageura ............................. 395/500
5,263,172  11/1993  Olnowich ........................... 395/550

Primary Examiner—Davis L. Willis
Assistant Examiner—Peter J. Rashid
Attorney, Agent, or Firm—Henry I. Schanzer

[57] ABSTRACT

A bar code scanner suitable for use with a variety of different host terminals includes a microcontroller whose frequency of operation is changed as a function of the host terminal to which the scanner is connected. Where a particular host terminal is operable at a lower rate the microcontroller may be operated at a lower frequency to reduce the power consumption of the scanner.

12 Claims, 3 Drawing Sheets

BAR CODE SCANNER OPERABLE AT DIFFERENT FREQUENCIES

BACKGROUND OF THE INVENTION

This invention relates to bar code scanners ("readers") and, in particular, to a bar code scanner suitable for use with a variety of different host terminals having different operating characteristics, with the scanner being operable at different frequencies for reducing power consumption.

Bar code scanners are designed to read (sense or scan) bar code data and to convert the sensed data into a form suitable for use with a host terminal. Host terminals may be any one of a large group of machines, such as the IBM 4683, any IBM PC, DEC terminals, or the TELXON 710, among others. These machines have different operating characteristics. It is desirable to have a bar code scanner which can be operated and be compatible with a large number of these different type of host terminals.

A bar code scanner may be powered via a battery pack integral to the scanner or it may be powered from a host terminal to which it is connected via a wire or cable. The host terminal in turn may be of the type which is line powered (e.g., 110 v, 60 Hz) or it may be of the type which is battery powered. When the bar code scanner is connected to a line powered host terminal, the power consumption of the scanner is normally not critical and is not of concern to the user or operator of the bar code scanner. However, when the bar code scanner derives its power from a battery operated host terminal or when the scanner is powered by its own battery pack the power dissipation (consumption) of the scanner becomes critical. It is elementary that it is desirable and/or necessary to reduce the amount of power used by a battery operated system whereby it can be used for a longer period of time without the need to either recharge the battery or replace it.

The host terminals normally dictate the speed at which they will accept or supply data and they impose their requirements on the bar code scanners with which they interface. As noted above, line powered host terminals are, typically, not designed with the aim of conserving power and will require that the bar code scanners to which they are connected be capable of operating at high speeds which normally results in a high degree of power consumption. On the other hand, battery operated host terminals are designed to conserve power and normally require that the bar code scanners with which they interface be capable of operating at lower speeds with a premium being placed on reducing power consumption.

A problem arises when it is desired to have a particular bar code scanner operate with different host terminals whose specifications and requirements are significantly different. For example, a scanner operable with an IBM point of sale (POS) terminal 4683, which functions as a cash register, must be capable of operating at high data rates. To operate at the high data rates the scanner must include a high speed microcontroller or microprocessor, capable of operating at high frequencies (e.g., 12 to 18 MHz). High speed microcontrollers are available but they and their associated circuitry and the resulting system tend to conduct relatively large currents and hence tend to dissipate a significant amount of power. However, the IBM 4683 host terminal is line powered and the power consumption of the system is of little, if any, concern.

The problem occurs when a scanner designed for use with a host terminal such as the IBM 4683 is also intended to be used with a battery operated host terminal whose speed and power requirements are much lower than those of the IBM 4683 and where it is important to conserve power. It is known to render the scanner with its high speed microcontroller compatible with the slow battery operated system by providing circuitry and/or software means within the microcontroller which can accept and handle high speed information and convert it for lower speed operation. This can be done, for example, by looping the information around shift registers (or by other known mechanisms) so as to render the data supplied by the microcontroller compatible with the data requirements of a slower battery operated host system.

However, this solution does not reduce the significant amount of power dissipated by the microcontroller itself which is being operated at the high speeds required for operation with the much faster host terminals such as the IBM 4683.

SUMMARY OF THE INVENTION

Applicant's invention resides in the recognition of this problem and in the design of a system in which a bar code scanner for use with a different host terminals includes a microcontroller (or microprocessor) whose operating frequency is changed depending on the host terminal to which it is connected. This enables the scanner to be compatible with the host terminal to which it is connected and at the same time reduces power consumption where needed.

By way of example, a scanner embodying the invention may be used with either one of two (or more) different host terminals; where the first host terminal requires operation at a high speed, high frequency, fH, and the second host terminal requires operation at a lower speed, lower frequency, fL, and where fL is equal to fH/n and n is any number greater than one (1). A scanner embodying the invention includes a microcontroller and a timing circuit for producing a first, high frequency, clocking signal for operating the scanner and any associated system at a frequency f1 sufficiently high to render it compatible with the first host terminal and a second, lower frequency, clocking signal for operating the scanner and any associated system at a frequency f2 sufficient for it to be rendered compatible with the second host terminal. The scanner further includes means for coupling the scanner to either the first or the second host terminal and means responsive to the host terminal to which the scanner is connected for either applying to the first or the second signal to the microcontroller.

In a particular embodiment of the invention the timing circuit includes an oscillator circuit to generate the first clocking signal and a counting or divider circuit connected to the oscillator to produce the second clocking signal.

In another embodiment of the invention a phase locked loop (PLL) is connected to an oscillator circuit to generate clocking signals suitable for operating the microcontroller at a frequency suitable to interface with a particular host terminal.

Thus, in systems embodying the invention the frequency at which the scanner's microcontroller is operated is a function of the characteristics of the host terminal to which the scanner is coupled. Consequently, where a host terminal may be operated at a lower data rate requiring lower speed, the frequency at which the microcontroller of the scanner is operated is lowered to reduce power consumption.

BRIEF DESCRIPTION OF THE DRAWING

In the accompanying figures like reference characters denote like components.

DETAILED DESCRIPTION OF THE INVENTION

Figure 1:
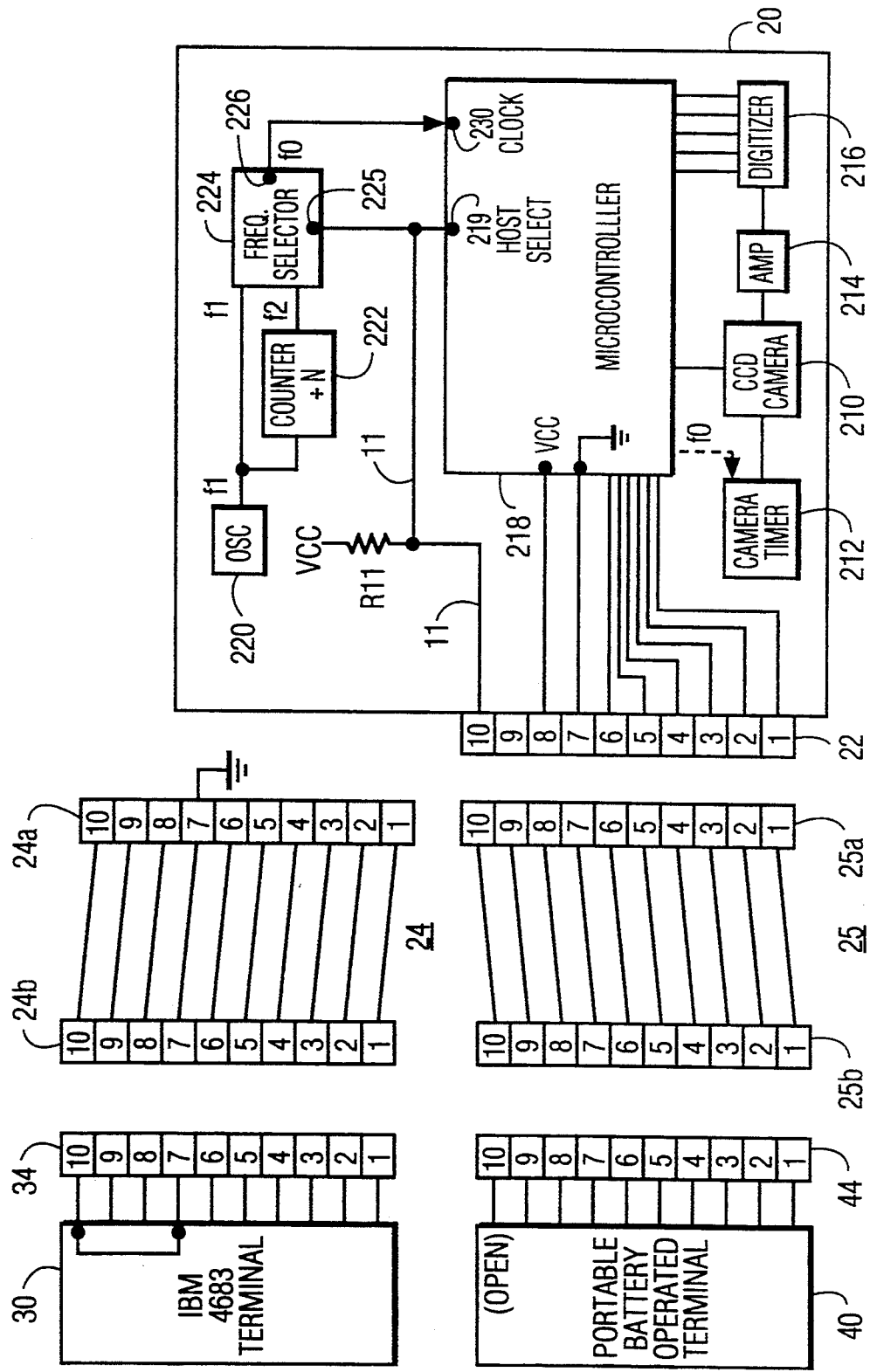
FIG. 1 is a block diagram illustrating a system embodying the invention.

Referring to FIG. 1, there is shown a bar code scanner 20 which can be connected via a connector 22 either to an IBM 4683 host terminal 30 or to a portable battery operated host terminal 40. The IBM 4683 terminal 30 is an example of a host terminal operated from the power line (i.e., 110 v, 60 Hz) and which is used to process the information read and transmitted to it by the bar code scanner 20. The IBM 4683 is a standard piece of equipment available in the industry which defines and specifies the type and the frequency of the information that must be supplied to it. By way of example, it is assumed that the IBM 4683 requires data to be supplied (inputted) to it at a rate of 187.5 KBPS (Kilo Bytes Per Second). To meet the data rate requirement of the IBM 4683 the microcontroller in the bar code scanner should be operated at a minimum frequency of 12 MHz. In the system of FIG. 1 the IBM 4683 has a connector 34 via which it is selectively connected to scanner 20. The scanner 20 has a connector 22 to which a selected host terminal gets connected. A cable 24 having ends 24a and 24b connects scanner 20 to host 30 with cable end 24a connecting to connector 22 and cable end 24b connecting to connector 34

The portable battery operated host terminal 40, as its name suggests, is operated from a battery pack. Terminal 40 is designed to operate and accept data at a rate of, for example, 4800 bytes per second (i.e., 4.8 KBPS). This is a much lower rate than the IBM 4683 and is typical of most battery operated systems which are designed for operation at lower data rates and lower power dissipation. In theory, a scanner designed for operation with host terminal 40 could be designed such that its microcontroller would be operated at a frequency which is 187.5/4.8 times smaller than the IBM 4683 (e.g., 12 MHz/39). However, in practice, other constraints may limit the lowest frequency of operation. But, in any event, the frequency at which the microcontroller will be operated when the scanner is coupled to host terminal 40 will be much less than that when the scanner is connected to host terminal 30, as further discussed below. Host terminal 40 has a connector 44 via which it is connected to scanner 20. A cable 25 having ends 25a and 25b may be used to connect host 40 to scanner 20 with cable end 25a being connected to conductor 22 and cable end 25b being connected to conductor 44.

Scanner 20 includes a CCD camera 210 for reading bar code data, camera timer circuitry 212 for applying scanning signals to the camera 210, amplifying circuitry 214 for sensing and amplifying the output of the CCD camera array, and digitizing circuitry 216 for coding the information read out of the camera 210 and rendering it compatible for use with the microcontroller 218. The camera timer circuitry 212 may be coupled to, and controlled by, the oscillator 220 or may contain a timing control which is independent of oscillator 220. The microcontroller 218 may be, for example, a M37702 made by Mitsubishi or any other type of microcontroller (or microprocessor). The microcontroller must be capable of processing information received from the bar code reading camera (e.g., 210) and of supplying information to an output connector 22 to which different host terminals may be selectively connected. That is, different types of host terminals may be connected to connector 22 and microcontroller 218 must be capable of driving any suitable host terminal connected to terminal 22. The microcontroller must also be adapted to receive information from any number of host terminals and to interface with the particular host terminal to which it is connected so that there is complete exchange of information between the scanner and the associated host terminal (e.g., 30 or 40 or any other) connected to connector 22.

For example, it is assumed that data and control signals are coupled between the controller 218 and the host terminals via input-output lines 1 through 5 of connector 22 and that information indicative of which host terminal is connected to connector 22 may be produced on selected ones of the remaining pins or lines of connector 22.

Scanner 20 includes an oscillator 220 for producing an output frequency f1. For purpose of illustration it is assumed that f1 is the minimum frequency needed to operate controller 218 to appropriately drive terminal 30. The scanner also includes a counter 222, which may be any one of a number of known counting or dividing circuit. Counter 222 is connected to the output of oscillator 220 to produce a frequency f2 which is a fraction of f1 (e.g., f2 is equal to f1/32) with f2 being the minimum frequency needed to operate controller 218 to appropriately drive host terminal 40. The frequency signals f1 and f2 are applied to operating frequency selector 224. Frequency selector 224 has an input terminal 225 to which is connected an input line 11. In response to a high or low signal on line 11, frequency selector 224 supplies a clocking signal of having a frequency of either f1 or f2 at its output terminal 226. The output 226 of frequency selector 224 is connected to the clock input 230 of controller 218, whereby controller 218 is either operated at a frequency f1 or at a frequency f2. For the scanner 20 of FIG. 1, the input select line 11 connected to pin 10 of connector 22 and to select input terminal 225 is also connected to an input 219 of controller 218. The high or low signal applied to input 219 informs the controller 218 whether it is connected to host terminal 30 or 40 and causes the controller 218 to accept and/or produce signals suitable for operation with the appropriate host terminal to which it is connected. For the example of FIG. 1, line 11 is coupled via a resistor R11 to VCC volts, which represents the "high" logic voltage applied to the controller 218.

The selection of the clock frequency applied to controller 218 is determined as follows. When the connector 22 of scanner 20 is connected via cable 24 to connector 34 of the IBM 4683 host terminal, the signal on line 11 is grounded via a link between pins 10 and 7 in connector 34. Pin 7 is grounded at the connector 22 (or at some other point) and the ground signal is coupled via pins 7 and 10 to line 11 which is coupled to input 225 of frequency selector 224 and input 219 of controller 218. The "low" on line 11 provides a signal to selector 224 and causes the frequency f1 to be applied to controller 218. Concurrently, the "low" on line 11 is also applied to terminal 219 whereby the controller 218 recognizes that it is connected to an IBM 4683. Controller 218 is programmed to then produce and accept signals which are suitable and compatible with those needed for proper operation of the IBM 4683 host terminal.

Similarly, for the example of FIG. 1, when the connector 22 of scanner 20 is connected via cable 25 to connector 44 of the portable battery operated terminal 40, the signal on line 11 is "high" and remains "high" due to the fact that pin 10 of conductor 44 is, ungrounded (open). Therefore, the "high" signal on line 11 is applied to input terminals 225 and 219. The high applied to input terminal 225 causes selector 224 to produce an output frequency fo equal to f2 and to apply the clocking signal of frequency f2 to clock input 230 of controller 218. Concurrently, the "high" on line 11 is also applied to terminal 219 of controller 218 whereby the controller 218 is programmed to recognize that it is connected to portable battery operated terminal 40. Controller 218 is programmed to then produce and accept signals which are suitable and compatible with those needed for proper operation of host terminal 40.

Figure 2:
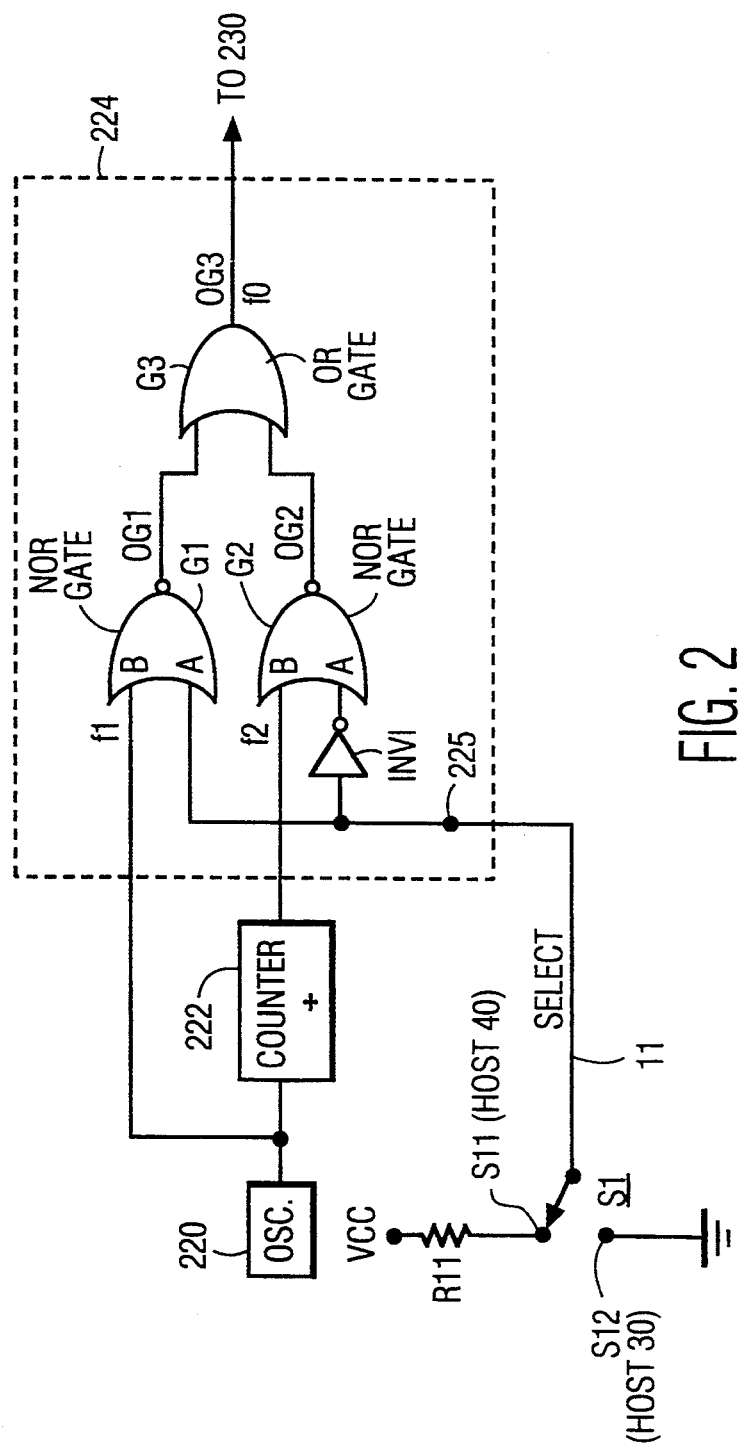
FIG. 2 is a block diagram of a selection circuit for use in systems embodying the invention.

Frequency selector 224 may be implemented in several different ways. A particular arrangement is shown in FIG. 2. Also, the application of the control signals via line 11 and the connectors may be represented by a switch as shown in FIG. 2.

FIG. 2 shows an oscillator 220 whose output (f1) is applied to the input of a counter 222 and to one input (B) of a NOR Gate G1. Counter 222 may be any one of a number of divider circuits. For ease of illustration and simplicity counter 222 may be a binary divider. However, it is evident that any counter could be used. The output f2 of counter 222 is applied to one input (B) of NOR Gate G2. A select control line 11 is connected to an input (A) of NOR Gate G1 and to the input of an inverter, INV1, whose output is connected to an input A of NOR Gate G2. The output, OG1, of gate G1 and the output, OG2, of Gate G2 are connected to respective inputs of two input OR Gate G3. The output, of OG3, of Gate G3 is connected to clock input terminal 230 of controller 218.

NOR gates G1 and G2 and OR gate G3 form the frequency selector 224 with input terminal 225 being the terminal to which line 11 is connected and to which input A of G1 and the input to INV1 are connected.

Line 11 is shown connected to a switch S1 which can be thrown to the S12 position which is grounded or to the S11 position which is connected via a resistor R11 to VCC volts and hence is high. When S1 is in the S12 position it is equivalent to the condition for which the IBM 4683 (host 30) is connected to the scanner 20 and when S1 is in the S11 position it is equivalent to the condition for which host 40 is connected to the scanner 20.

When selector switch S1 is in position S11 (high), the select signal is "high", gate G1 is deselected with OG1 being equal to a "low" or a logic "0" for all value of f1. Concurrently, when a select signal on line 11 is high, it is inverted by INV1 whereby the "A" input to G2 is low and whereby G2 is selected and its output OG2 is equal to the inverse of f2.

When S1 is in position S12 (low), the select signal on select line 11 is "low". For this condition the input A to NOR gate G1 is low and G1 is selected with OG1 being equal to the inverse of f1. Concurrently, for the low on line 11 inverter INV1 produces a high signal at the input A of NOR gate G2. With its A input high, G2 is deselected with OG2 being a logic "0" or "low" for all values of f2.

Thus, for the condition where select switch S1 is in position S12 (i.e., the scanner 20 is connected to host 30) the output OG1 is equal to f1-bar (that is, the inverse of f1); and for S1 in position S11 (i.e., the scanner 20 is connected to host 40) the output OG2 is equal to f2-bar (that is, the inverse of f2).

The signals present at OG1 and OG2 are applied to the input of OR gate G3 whereby the output, OG3, of OR gate G3 is equal to f1-bar when S1 is in the "low" position S12 and is equal to f2-bar when S1 is in the "high" position S11.

The output (f0) of OR gate G3 is applied to the clock input (CLK), 230, of microcontroller 218. Thus, a signal of frequency f1 or a signal of frequency f2 is applied to clock terminal 230 of controller 218. Assume that f1 is equal to 12 MHz and that the counter 222 divided by 8; Then f2 is equal to 1.5 MHz. Then for this condition with S1 in the "low" position of is 12 MHz and with S1 in the "high" position fo is 1.5 MHz. The controller 218 when operated at an of of 1.5 MHz would consume approximately ⅛th of the power when operated at an fo of 12 MHz.

Figure 3:
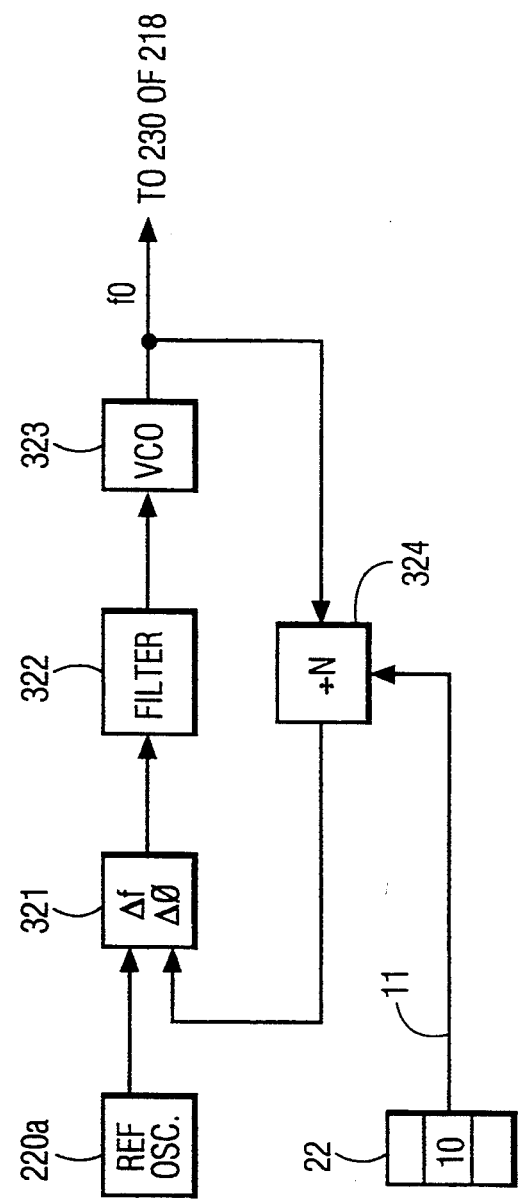
FIG. 3 is a block diagram illustrating another selection circuit for use in systems embodying the invention.

The oscillator circuit and frequency selector circuitry could also be implemented using the circuitry shown in FIG. 3.

FIG. 3 illustrates the use of a phase-locked loop (PLL) circuit to produce the desired frequency applied to the microcontroller 218. In FIG. 3 a reference oscillator 220a producing a frequency fosc is coupled to a frequency difference (error) sensor 321 whose output is then applied to a filter 322 whose output, in turn, is connected to a voltage controlled oscillator (VCO) 323, which functions as a voltage to frequency converter. The output fo of VCO 323 fed to a counter stage 324 whose output is connected (fed) back to an input of error sensor 321. The frequency fo is equal to (fosc) (N). A select line 11 is applied to counter stage 324 to set the counter to a desired value of N; where N may be any integer. The counter N may be a binary counter. But counter N need not be a binary counter. It may be any other type of suitable or appropriate counter whose count or divider ratio may be modified by a signal on line 11 or additional lines to line 11.

The invention has been illustrated for the case of two different host terminals. However, it should be evident that many different types of host terminals could be accommodated. Of course, this may require more than one line (e.g., 11) to decode and recognize the different types of host terminals.

Finally, as noted above, the counter N controlling and determining the frequency f2 may be varied over a wide range. Clearly, any reduction in frequency applied to controller 218 results in reduced power dissipation. The lowest frequency generated and applied being determined by the system requirements to ensure proper operation,

What is claimed is:

1. A bar code scanner for use with one of a first host terminal operable at a relatively high frequency (fH)

and a second host terminal operable at a relatively lower frequency (fL), said bar code scanner including:
 a microcontroller responsive to a clocking signal for operating said microcontroller at a speed and at a power level which is a function of the frequency of the clocking signal;
 controllable timing means for generating clocking signals at a clock terminal, said controllable timing means being settable to a first state in which it produces a first clocking signal of frequency f1 at said clock terminal, and settable to a second state in which it produces a second clocking signal of frequency f2 at said clock terminal, where f2 is less than f1;
 means coupled between the clock terminal and the microcontroller for supplying the clocking signals at said clock terminal to said microcontroller;
 means for coupling said bar code scanner to one of said first and second host terminals at a time; and
 means contained within said bar code scanner responsive to said bar code scanner being coupled to said first host terminal for setting said controllable timing means to said first state and being responsive to said bar code scanner being coupled to said second host terminal for, setting said controllable timing means to said second state, for enabling the particular host terminal, connected to the bar code scanner, to determine the frequency of the clocking signal fed from the controllable timing means to the microcontroller thereby controlling the frequency of operation of the microcontroller and its power dissipation.

2. A bar code scanner as claimed in claim 1 wherein said timing means includes an oscillator for producing said first clocking signal and a counter circuit coupled to said oscillator for producing said second clocking signal.

3. A bar code scanner as claimed in claim 2 wherein said bar code scanner is coupled to said first host terminal via a first connection and wherein said bar code scanner is connected to said second host terminal via a second connection; and
 wherein said first connection controls the application of the first clocking signal to said microcontroller and the second connection controls the application of the second clocking signal to the microcontroller.

4. A bar code scanner as claimed in claim 3, wherein said first connection sets the microcontroller for operation with said first host terminal and wherein said second connection sets the microcontroller for operation with the second host terminal.

5. A bar code scanner as claimed in claim 2, wherein said timing means includes logic means responsive to said first and second clocking signals for selectively producing at an output terminal either said first clocking signal or said second clocking signal.

6. A bar code scanner as claimed in claim 5 wherein said microcontroller has a clock input terminal and wherein said output terminal is coupled to said clock input terminal.

7. A bar code scanner as claimed in claim 1 wherein said timing means includes a phase locked loop.

8. A bar code scanning system comprising:
 a bar code scanner operable at different frequencies and including means for selectively setting its operating frequency to one of those frequencies, the speed of operation and the power dissipation of the bar code scanner being a function of its operating frequency; the bar code scanner being characterized in that it is capable of sending information to, and receiving information from, several different types of host terminals, with each different type of host terminal having a preferred frequency of operation and power dissipation level; and
 means for selectively coupling the bar code scanner to a selected one of said several different types of host terminals including means, within the scanner, for, in response to the coupling of the bar code scanner to a particular host terminal, setting the operating frequency of the bar code scanner to one compatible with the preferred frequency of operation of the host terminal to which it is coupled.

9. The bar code scanning system as claimed in claim 8, wherein said bar code scanner and said means for selectively setting its operating frequency includes a controllable timing circuit for generating clocking signals at a clock terminal, said controllable timing circuit being settable to produce clocking signals having different frequencies at said clock terminal; and
 said bar code scanner including a microcontroller coupled to said clock terminal for receiving said clocking signals and operating at a frequency corresponding to the frequency of the clocking signals.

10. The bar code scanning system as claimed in claim 9, wherein said means for selectively coupling the bar code scanner to a selected host terminal includes a bar code scanner connector having a plurality of terminals coupled to said microcontroller and controllable timing circuit; and wherein said means for selectively coupling also includes a cable coupled between the bar code scanner connector and a host terminal connector located on the host terminal for coupling a control signal from the host terminal via the host and scanner connectors to set the controllable timing circuit to a preferred operating frequency.

11. The bar code scanning system as claimed in claim 9, wherein said controllable timing circuit includes an oscillator and a counter circuit for selectively producing a first clock signal of frequency f1 and a second clock signal of frequency f2, wherein f1 is greater than f2; and wherein said controllable timing circuit also includes means responsive to the presence of a first control signal indicative of the presence of a first type of host terminal to couple said first clock signal to said clock terminal and responsive to the presence of a second control signal indicative of the presence of a second type of host terminal to couple said second clock signal to said control terminal.

12. A bar code scanner, for use with different types of host terminals having different preferred frequencies of operation, comprising:
 a microcontroller being operable in response to a clocking signal and capable of operating at different frequencies of said clocking signal; the speed of operation and power dissipation of the microcontroller being a function of the frequency of the clocking signal applied thereto;
 a source of clocking signal settable to produce clocking signals of different frequencies;
 means coupling the source of clocking signals to said microcontroller for applying clocking signals to said microcontroller and operating said microcontroller at the frequency of said clocking signals; and connector means for coupling said microcontroller and source of clocking signals to one of several different types of host terminals, external to said bar code scanner, said connector means including means responsive to a particular host terminal to which the bar code scanner is connected for setting the source of clocking signals to produce clocking signals having a frequency compatible with the preferred frequency of operation of that particular host terminal.

* * * * *